United States Patent [19]

Babu

[11] Patent Number: 5,578,380

[45] Date of Patent: Nov. 26, 1996

[54] CROSSLINKABLE SILARYLENE-SILOXANE COPOLYMERS

[76] Inventor: Gaddam N. Babu, P.O. Box 33427, St. Paul, Minn. 55133-3427

[21] Appl. No.: 250,586

[22] Filed: May 27, 1994

Related U.S. Application Data

[60] Division of Ser. No. 10,656, Jan. 28, 1993, Pat. No. 5,346,980, which is a continuation-in-part of Ser. No. 868,534, Apr. 14, 1992, abandoned.

[51] Int. Cl.$^6$ .............................. C08G 77/20; B32B 9/04; C08F 283/12
[52] U.S. Cl. ........................... 428/447; 428/448; 528/32; 528/24; 528/15; 528/31; 528/40; 528/43; 528/41; 525/474; 525/478; 522/99
[58] Field of Search ................................... 528/32, 24, 15, 528/31, 40, 43, 41; 525/474, 478; 428/447, 448; 522/99

[56] References Cited

U.S. PATENT DOCUMENTS

| | | | |
|---|---|---|---|
| 2,562,000 | 7/1951 | Sveda | 300/46.5 |
| 3,287,310 | 11/1966 | Omietanski | 260/37 |
| 3,332,973 | 7/1967 | Merker | 260/448.2 |
| 3,444,127 | 5/1969 | Webb | 260/46.5 |
| 3,959,403 | 5/1976 | LaRochelle | 260/825 |
| 4,340,711 | 7/1982 | Evans | 528/21 |
| 4,366,323 | 12/1982 | Rosenberg et al. | 556/433 |
| 4,534,838 | 8/1985 | Lin et al. | 204/159.13 |
| 4,563,514 | 1/1986 | Liu et al. | 427/54.1 |
| 5,104,952 | 4/1992 | Babu | 526/279 |
| 5,112,882 | 5/1992 | Babu et al. | 522/158 |
| 5,192,616 | 3/1993 | Babu | 428/407 |
| 5,194,501 | 3/1993 | Babu et al. | 525/103 |
| 5,202,361 | 4/1993 | Zimmerman et al. | 522/120 |
| 5,209,971 | 5/1993 | Babu et al. | 428/343 |
| 5,227,442 | 7/1993 | Babu et al. | 526/279 |
| 5,266,399 | 11/1993 | Babu et al. | 428/343 |
| 5,278,244 | 1/1994 | Babu | 525/292 |
| 5,294,668 | 3/1994 | Babu | 525/80 |
| 5,296,561 | 3/1994 | Babu et al. | 525/342 |
| 5,298,708 | 3/1994 | Babu et al. | 219/728 |
| 5,346,980 | 9/1994 | Babu | 528/40 |

OTHER PUBLICATIONS

Babu et al. "Polymerization of 1,4–Bis(hydroxydimethylsilyl)benzene . . . " Macromolecules 1991 vol. 24 pp. 4503–4509.

Macromolecules, vol. 24, No. 16, pp. 4503–4509 and 4510–4514 (1991).

Journal of Polymer Science: Polymer Chemistry, vol. 11, 1973, pp. 319–326.

Journal of Polymer Science: Polymer Symposia, No. 70, 1982, NY, pp. 91–105.

*Primary Examiner*—Margaret W. Glass

[57] ABSTRACT

Crosslinkable copolymers suitable for use as elevated temperature pressure-sensitive adhesives comprise randomly arranged silarylene units and siloxane units. Preferably, there is present in the copolymer backbone in the range of 0.8 to 1.2 siloxane to silarylene units, and there being present in the copolymer a crosslinking functionality.

25 Claims, No Drawings

CROSSLINKABLE SILARYLENE-SILOXANE COPOLYMERS

This is a division of Application No. 08/010,656 filed Jan. 28, 1993, now U.S. Pat. No. 5,346,980, which was a CIP of application Ser. No. 07/868,534, filed Apr. 14, 1992, now abandoned.

FIELD OF THE INVENTION

The present invention relates to thermal and ultraviolet (UV) radiation curable silarylene-siloxane random copolymers and cured compositions thereof, and to a process for making the copolymer. The cured silarylene-siloxane copolymers are elevated temperature resistant pressure-sensitive adhesives (PSAs).

BACKGROUND OF THE INVENTION

Silicone pressure-sensitive adhesives are well known. Generally, they comprise a mixture of a silicone polymer, a tackifier resin, solvents, viscosity stabilizers, and other additives and are cured by thermal and/or catalytic means. Silicone polymers used in these mixtures are gums containing dimethylsiloxy and diphenylsiloxy groups and siloxy groups having a group useful in a crosslinking reaction such as a vinyl or acrylic group. Such adhesives, although useful for many applications, fail for applications necessitating elevated temperatures.

Silicone polymers containing organic groups in addition to oxygen atoms between silicone atoms are well known. These polymers in which the organic group is an arylene group are known as silarylene polymers and those polymers also containing diorganosiloxy groups are known as silarylene-siloxane copolymers. These copolymers can generally be cured by exposure to ionizing radiation or by heating in the presence of well known catalysts. Silarylene-siloxane and siloxane units in the copolymer may have a random distribution as is disclosed in U.S. Pat. Nos. 2,562,000, 3,287,310, 3,332,973, and 4,340,711 or the units may be blocks as is disclosed in U.S. Pat. No. 3,959,403. U.S. Pat. No. 3,444,127 discloses ordered poly(arylenesiloxane) polymers, and U.S. Pat. No. 4,366,323 discloses arylene-siloxanylene polymers.

The silarylene-siloxane copolymers described above can be useful, for example, in high temperature resistant fluids, fibers, coatings, or elastomers.

U.S. Pat. No. 4,534,838 discloses photo-initiating silicones and makes reference to others.

U.S. Pat. No. 4,563,514 discloses radiation curable polysilarylene-polysiloxane copolymers which can be crosslinked in the presence of a suitable cure initiator to provide transparent, self-bonding, dirt repellent, tough, and solvent resistant compositions.

Vinyl substituted silarylene-siloxane copolymers are disclosed in Macromolecules, Vol. 24, No. 16, pages 4503–4509, and 4510 to 4514 (1991). Silarylene-siloxane compositions curable to pressure-sensitive adhesives are not disclosed.

None of the above art or any other art of which the inventor is aware provides a silarylene-siloxane copolymer composition that is curable to an elevated temperature-resistant pressure-sensitive adhesive.

SUMMARY OF THE INVENTION

Briefly, a crosslinkable silarylene-siloxane pressure-sensitive adhesive copolymer composition comprises a copolymer comprising a backbone having randomly arranged silarylene and siloxane units, of which siloxane units at least 55 mol percent are aryl siloxane units, the copolymer comprising at least 0.05 mol percent crosslinking functionality. Preferably, there can be in the random copolymer backbone no more than six, more preferably an average of no more than two, and most preferably no more than two, consecutive units of either silarylene or siloxane units. Because the copolymer is curable there is present in the copolymer a crosslinking functionality.

The silarylene-siloxane copolymer composition is curable to a pressure-sensitive adhesive that is resistant to degradation at elevated temperatures. The silarylene-siloxane copolymer comprises units of

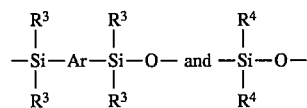

in which Ar, $R^3$, and $R^4$ are defined below. In a most preferred embodiment, there are present 1:1 alternating silarylene and siloxane units.

In another aspect, there is provided a process for making the silarylene-siloxane copolymer.

In a further aspect of the invention, there is provided an article comprising a substrate bearing on at least one surface thereof an elevated temperature-resistant pressure-sensitive adhesive layer of the cured composition described above.

In this application:

"silarylene" in a polymer means a silarylenesiloxy unit having the structure

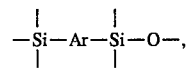

wherein

Ar is as defined below;

"siloxane" means a polymer having Si-O groups, i.e., the siloxy unit,

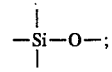

"acrylic acid" or "acrylic acid ester" means to include methacrylic acid or methacrylic acid ester;

"lower alkyl" means $C_1$ to $C_4$, linear or branched; and

"group" means the specified moiety or any group containing the specified moiety (as by substitution or extension) that does not adversely affect the composition.

DETAILED DESCRIPTION OF PREFERRED EMBODIMENTS OF THE INVENTION

Briefly, in a preferred embodiment, the silarylene-siloxane copolymer composition of the invention that is curable to a pressure-sensitive adhesive, and that is resistant to degradation at elevated temperatures, comprises a copolymer having the general formula:

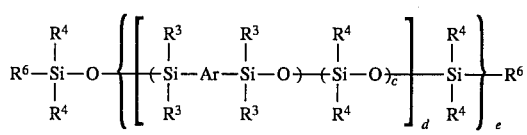

wherein $R^3$ is independently a lower alkyl group having 1 to 4 carbon atoms, preferably a methyl group;

Ar is an arylene or alkylenearylene group having 6 to 20 carbon atoms, that optionally can comprise 1 to 3 rings that can be fused or joined by a covalent bond or —O—,

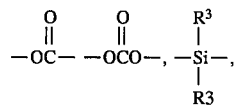

or linear, branched, or cycloalkylene of up to 6 carbon atoms which can be substituted with fluoroalkyl groups having 1 to 3 carbon atoms and having 1 to 7 fluorine atoms;

each $R^4$ is an organic group independently selected from aryl groups having 5 to 12 carbon atoms, linear and branched alkyl groups having 1 to 6 carbon atoms, and $R^5$ groups, of which total $R^4$ groups 55 to 95 mol percent are aryl, preferably phenyl, 5 to 45 mol percent are alkyl groups, preferably methyl, and 0.05 to 5 mol percent are $R^5$ groups which is defined below;

c is a number having a value of 0.8 to 1.2 expressing the number of siloxane groups per arylene or alkarylene group, preferably c has a value of 0.9 to 1.1 and most preferably is 1;

d is a number having an average value of 50 to 500;

e is a number having a value from 1 to about 200 so that the weight average molecular weight of the copolymer is between about $2 \times 10^4$ and $5 \times 10^6$;

each $R^6$ is a terminal group that independently may be hydroxyl, lower alkyl, phenyl, or $R^5$; and $R^5$ which is required to be present in at least one of $R^4$ and $R^6$, can be a functional crosslinking group selected from organic groups containing a) an ethylenically-unsaturated group selected from 1) groups crosslinkable under the influence of free radicals, preferably an acrylic acid ester-containing group and 2) groups crosslinkable in a hydrosilation reaction with copolyhydrosilane, preferably a vinyl-containing group, b) an oxirane group (generally called an epoxy and includes epoxy-containing group), preferably a glycidoxyalkylene group, and c) a group that is a photocrosslinker, such as a pendent benzophenoxy group, with the provisos:

(1) that at least 0.05 mol percent, preferably at least 0.5, more preferably 1.0 mol percent of $R^5$ is present as at least one of $R^6$ and $R^4$, and (2) that (a) when $R^5$ is an acrylic acid ester group there is present in the composition a sufficient amount of an initiator of free radicals to effect polymerization and thereby crosslinking of the acrylic groups, (b) when $R^5$ is a vinyl group attached directly to a Si atom there is present in the composition a sufficient amount of polyhydrosiloxane, preferably 1 to 5 weight percent, and a sufficient amount of catalyst, preferably 1 to 1000 ppm, for a hydrosilation reaction, (c) when $R^5$ is an oxirane-containing group there is present in the composition a sufficient amount of epoxy resin curative, preferably 1 to 5 weight percent, and (d) when $R^5$ is a photocrosslinking group it is present in the composition in sufficient amount, preferably 0.05 to 3 weight percent, to crosslink the polymers.

The weight average molecular weight of the copolymers preferably can be in the range of 20,000 to 5,000,000, more preferably 30,000 to 1,500,000, and most preferably 50,000 to 1,000,000.

The silarylene-siloxane copolymers of the invention are prepared by modification of methods known in the art for making silarylene-siloxane copolymers. The copolymers of the invention are prepared, for example, by the condensation of one mole of a silarylene compound of the structural formula

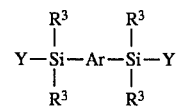

with from about 0.95 to 1.0 moles of diorganic group substituted silanes of the structural formula

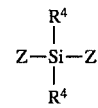

'in which $R^3$, $R^4$ and Ar are defined above and Y and Z are mutually reactive groups which independently are hydroxyl or a hydrolyzable group such as halogen, amine, or a substituted ureido. Preferably, Y is hydroxyl and Z is dialkylamino. The condensation reaction can be carried out at about 50° to 150° C., preferably at 80° to 110° in a hydrocarbon solvent such as cyclohexane, benzene, toluene, or xylene. When Y is hydroxyl and Z is substituted ureido such as

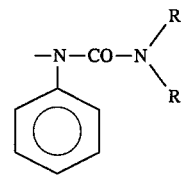

wherein each R independently can be a linear or branched alkyl group having 1 to 4 carbon atoms or both R groups together provide a cycloalkylene group having 4 to 8 carbon atoms, the condensation reaction can be carried out at 50° to 150° C. in chlorobenzene. Note: the substituted ureido groups referred to in the following discussion is specifically

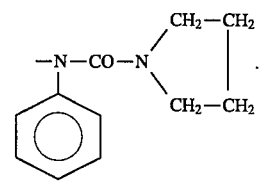

When either Y or Z is halogen, preferably chlorine, the condensation can be carried out at about −10° C. to 30° C. in a polar organic solvent such as tetrahydrofuran or chlorobenzene. The condensation reaction can be terminated by reaction with water. The polymer obtained by the condensation reaction typically has the structural formula:

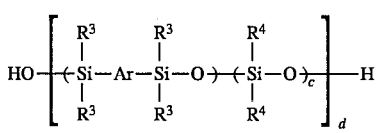

wherein Ar, $R^3$, $R^4$, b, and d are defined above. Although this copolymer, having terminal hydroxyl groups, can be used in the elevated temperature resistant pressure sensitive adhesive compositions of the invention, it is often desirable to replace the terminal hydroxyl group by reaction with silyl compounds $(R^4)_3SiZ$, to obtain terminated polymers or with $(R^4)_2R^6SiZ$ to obtain chain extended copolymers having structural Formula I. It is often desirable to react the copolymer with both an $(R^4)_2SiZ_2$ and an $(R^4)_2R^6SiZ$ silyl compound so as to obtain terminated chain extended copolymers.

In the preparation of the silarylene-siloxane copolymers, when either Y in the silarylene of formula II or the Z in the silane of formula III is halogen, there is formed a prepolymer having up to 6 repeating units of either silarylene or siloxane units, these being an average of 1.7 repeating units of silarylene and an average of 1.55 repeating units of siloxane. When Y is hydroxyl and Z is dialkylamine group, there is formed a prepolymer having up to 3 repeating units in a chain, averaging 1.7 repeating units of silarylene, and 1.02 repeating units of siloxane. When Y is hydroxyl and Z is uriedo, there are essentially only alternating units of silarylene and siloxane.

The present invention provides a method of preparing a crosslinkable polymer comprising the steps of:
1) reacting a mixture comprising a functional silarylene compound with a diorganic group substituted silane to provide a reactive precopolymer,
2) reacting said reactive precopolymer with a chain extending silyl compound to provide a high molecular weight copolymer (i.e., above 500,000 weight average molecular weight), and
3) optionally curing said high molecular weight copolymer to provide a crosslinked copolymer.

A summary of the Reaction Equations that can provide the copolymers of the invention are as follows:

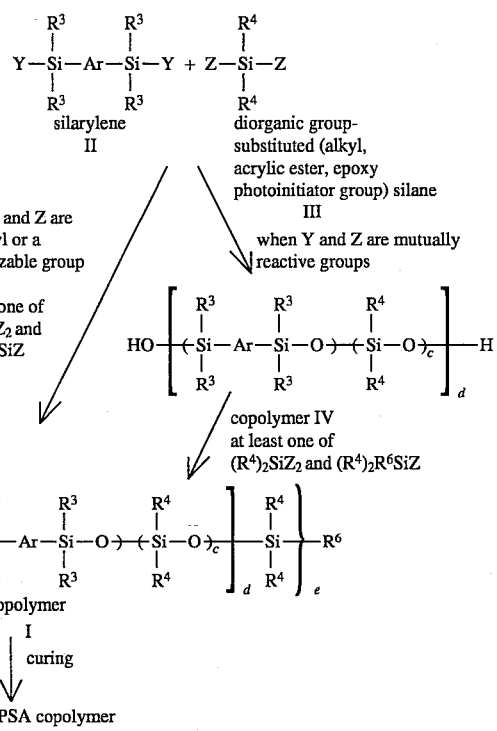

wherein Ar, Y, $R^3$, Z, $R^4$, d, c, e, $R^6$ are as previously defined.

Functional silarylene compounds suitable for use in the preparation of the copolymers of the invention are those compounds of Formula II, where Y is hydroxyl or a hydrolyzable group, preferably Y is hydroxyl or chlorine, and Ar is an arylene group which can contain heteroatoms such as O, e.g., as in ether or ester groups, preferably, phenylene or biphenylene group substituted by at least one lower alkyl group (i.e., $C_1$ to $C_4$, which can be substituted by halogen atoms); preferably Ar has at least one of the formulae:

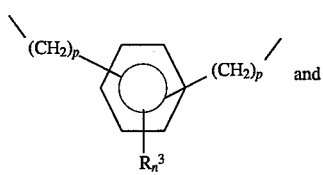

-continued

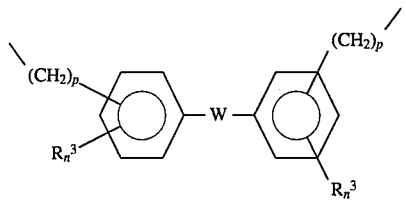

wherein each $R^3$ group is a lower alkyl group of 1 to 4 carbon atoms, n is zero or an integer having a value of 1 to 4 inclusive, p is zero or one, and W is selected from a covalent bond and the divalent groups: —O—,

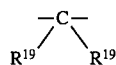

(in which $R^{19}$ is hydrogen, lower alkyl of 1 to 4 carbon atoms, or —CF$_3$)

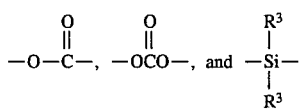

(wherein $R^3$ is as defined above), and —CH$_2$CH$_2$—. The following structural formulae illustrate suitable bis(di-lower-alkylhydroxysilyl)arenes and bis(di-lower-alkylhalosilyl)arenes which are preferred silarylene compounds of Formula II:

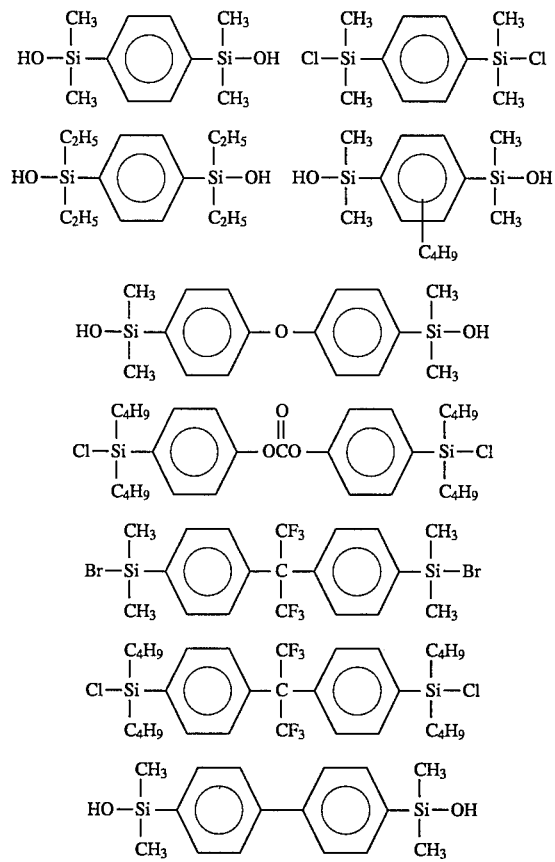

-continued

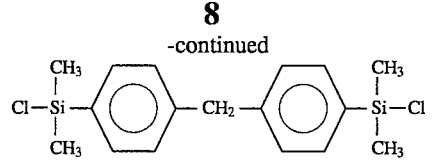

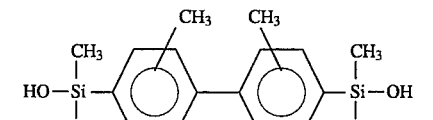

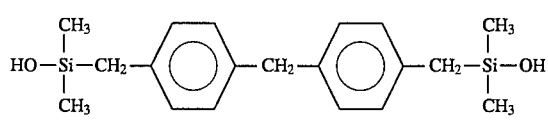

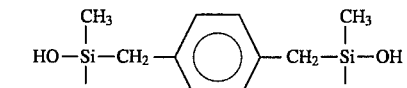

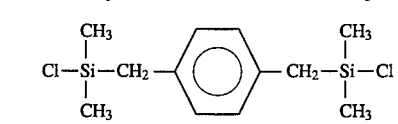

The bis(diloweralkylhalosilyl)arenes can be prepared according to the method disclosed in U.S. Pat. No. 4,709,054 by the reaction of an aromatic acyl halide with a halogenated polysilane in the presence of a transition metal catalyst. The bis(hydroxydiloweralkylsilyl)arenes can be prepared by the method disclosed in U.S. Pat. No. 3,202,634 by first preparing a hydrosilane, by reaction of an arene dihalide, with magnesium and a silane, in a modified Grignard reaction and then converting the hydrosilane to the corresponding diol by hydrolysis with aqueous NaOH or KOH. These patents are incorporated herein by reference for these disclosed methods.

Diorganic group-substituted silanes of Formula III suitable for use in the preparation of copolymers of the invention are of two classes: Class A silanes in which the organic groups of the silane compound, i.e., $R^4$ groups, are non-functional groups including alkyl groups that can be straight chain or branched and having 1 to 6 carbon atoms and aryl groups having 6 to 12 carbon atoms; and Class B silanes, in which the organic groups, i.e., $R^4$ groups, of the silyl compound is at least one group containing a functional group, i.e., $R^5$, which is the crosslinking (i e., curable) group of the copolymer. The diorganic group-substituted silanes are chosen so that 55 to 95 mole percent of the $R^4$ groups in the resulting copolymer are aromatic groups, 5 to 45 mole percent are alkyl groups, and 0.05 to 5 mole percent are organic groups containing a functional crosslinking group. Where less than 55 mole percent of the $R^4$ groups are aryl, the copolymers become increasingly tougher and are not pressure-sensitive.

Examples of Class A silanes which are commercially available include:
dichlorodimethylsilane
bis(dimethylamino)dimethylsilane
dichlorodiethylsilane
dihydroxydiphenylsilane
dichlorodiphenylsilane
dichloromethylphenylsilane
dihydroxydimethylsilane
bis(N-pyrrolidyl)dimethylsilane
bis(ureido)dimethylsilane
dihydroxydiethylsilane bis(diisopropylamino)diisopropylsilane
bis(ureido)di(1,1-dimethylethyl)silane
dihydroxydihexylsilane
bis(ureido)diphenylsilane
dihydroxydi-1-naphthylsilane
dichlorodi(4-phenylphenyl)silane
dihydroxymethylphenylsilane
bis(ureido)methylphenylsilane.
(the first six are available from Petrarch Systems Silanes and Silicones, Bristol, Pa.) The silanes then following can be prepared by known procedures as disclosed in *Metalorganic Polymers*, K. A. Andrianov, Interscience Publishers, N.Y. (1965) and Organosilicon Compounds, C. Eaborn, Butterworth Scientific Publications, London (1960).

Additional examples of Class A silanes can prepared as disclosed in *Macromolecules*, Vol. 24, No. 16, page 4504 (1991).

Class B silanes, the silanes in which an organic group contains a functional group that is used in the preparation of the copolymer if there are no crosslinkable groups present in the $R^6$ groups, are silanes of Formula III having two groups, Z, that are reactive in condensation reaction with groups Y of Formula II. The Class B silanes also can have one or two functional organic groups, $R^{5,}$ there being at least 0.05 mol percent, preferably at least 0.5 mol percent, and more preferably 1.0 mol percent of $R^5$ being present as at least one of $R^6$ and $R^4$ that in the copolymer are responsible for the crosslinking (curing) of the copolymer on exposure to activating energy (e.g., UV, E-beam, thermal). There are four subclasses of Class B silanes to provide the four choices for functional group $R^5$, defined above, as follows:

Class B(a) silanes are compounds having the general formula:

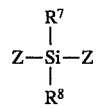

in which Z is hydroxyl or halogen; $R^7$ is selected from alkyl groups having 1 to 6 carbon atoms, aryl groups having 6 to 12 carbon atoms, and $R^8$; and $R^8$ is an ethylenically-unsaturated group that is crosslinkable under the influence of free radicals and includes such groups as

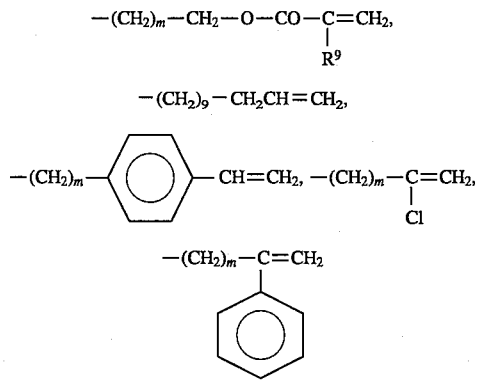

and preferably is

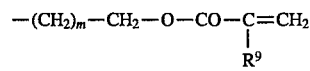

in which m can be an integer of 2 to 12 and $R^9$ can be —H or —$CH_3$.

Class B(b) silanes are compounds having the general formula:

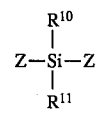

in which Z is hydroxyl or halogen; $R^{10}$ is selected from alkyl groups having 1 to 6 carbon atoms, aryl groups having 6 to 12 carbon atoms, and $R^{11;}$ and $R^{11}$ is a vinyl, propenyl, or butenyl group. Examples of Class B(b) silanes include: dihydroxymethylvinylsilane, dichloromethyl(5-hexenyl )silane, dihydroxy-2-propenylmethylsilane, dichloromethylvinylsilane*, dichloro-2-propenylmethylsilane, dichlorophenylvinylsilane*, dichlorodivinylsilane*, and dichlorodi(2-propenyl) silane.

available from Petrarch Systems Silanes and Silicones;
others can be prepared as disclosed in *Organosilicon Compounds*, supra.

Class B(c) silanes are epoxy group containing silanes having the general formula:

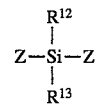

in which Z is defined above; $R^{12}$ is selected from alkyl groups having 1 to 6 carbon atoms, aryl groups having 6 to 12 carbon atoms, and $R^{13}$; and $R^{13}$ is an epoxy group having the formula:

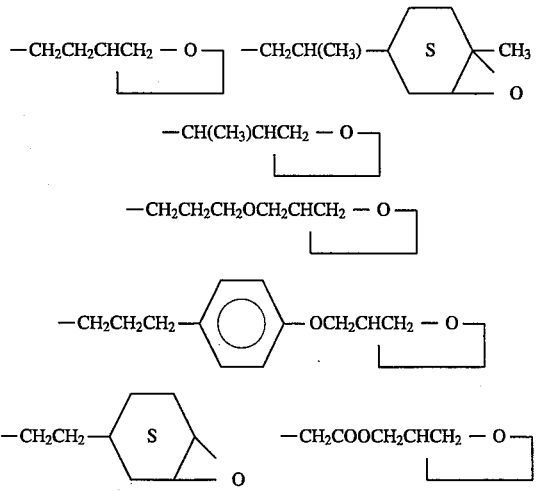

Class B(d) silanes are silanes that contain a photoinitiator group that is responsible for a photoinitiator induced crosslinking (curing) of the polymers under the influence of ultraviolet. Class B(d) silanes have the general formula

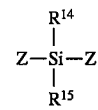

in which Z is defined above; $R^{14}$ is selected from alkyl groups having 1 to 6 carbon atoms, aryl groups having 6 to 12 carbon atoms and $R^{15;}$ and $R^{15}$ is a polymerization photoinitiating group. Included among such groups are:

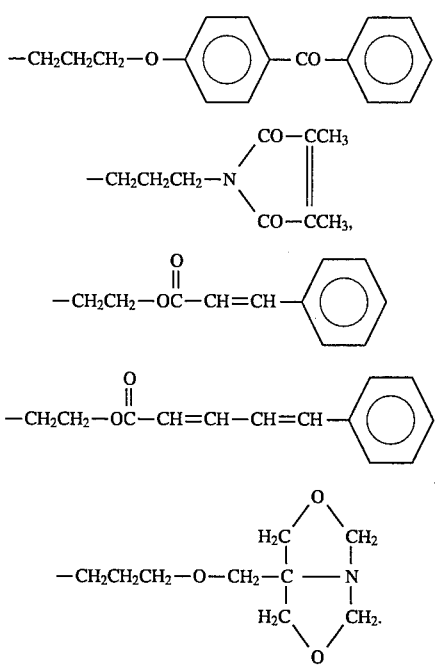

When $R^4$ of Formula I is a crosslinking group $R^5$ and $R^5$ is an ethylenically unsaturated group-containing organic group that is polymerizable by free radicals there is present in the copolymer composition a photoinitiator of free radicals to promote the polymerization of the acrylic acid ester group and effect crosslinking (curing) of the composition. Suitable photoinitiators include for example, acyloin and derivatives thereof such as benzoin, benzoin methyl ether,

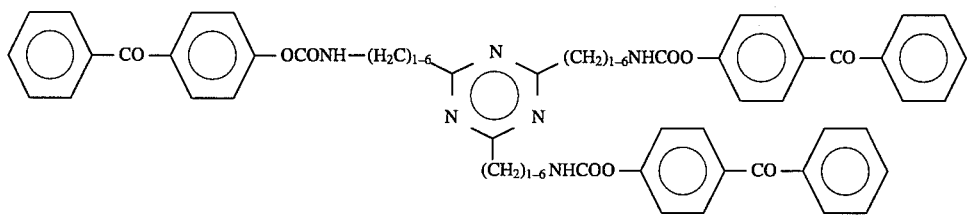

and

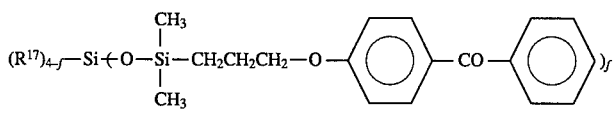

benzoin ethyl ether, benzoin isopropyl ether, benzoin isobutyl ether, and 2-hydroxy-2-methyl-1, 2-diphenylethanone; diketones such as benzil and 2,3-butanedione; and phenones such as acetophenone, 2,2-diethoxyacetophenone, 2,2-dimethoxy-2-phenylacetophenone, benzophenone, 4,4'-bis-(dimethylamino)benzophenone, and 1-hydroxycyclohexyl phenyl ketone. These photoinitiators are available from Aldrich Chemical Co. Also, useful are 2,2,2-tribromo-1-phenylethanone and 2,2,2-tribromo-1-(2-nitrophenyl)ethanone which can be prepared by known procedures. Generally, the radiation activated initiator is present in an amount of about 0.01 to 10 weight percent, preferably about 0.25 to 5 weight percent, and more preferably 0.5 to 1.5 percent by weight of the copolymer. The independent photoinitiators of polymer crosslinking listed above can also be used as photoinitiators of free radicals for promoting the polymerization.

Other photoinitiators that can also be used in the composition of the invention include, but are not limited to: aldehydes, such as benzaldehyde, acetaldehyde, and their substituted derivatives; ketones such as acetophenone, benzophenone and their substituted derivatives, particularly the 4-alkylbenzophenones wherein the alkyl group has 1 to 18 carbon atoms such as the methyl, ethyl, butyl, octyl, dodecyl, and octadecyl groups, and the commercially available derivatives such as Sandoray™ 1000 (Sandoz Chemicals, Inc., Charlotte, N.C.); quinones such as the benzoquinones, anthraquinone and their substituted derivatives; thioxanthones such as 2-isopropylthioxanthone (Polysciences, Inc., Warrington, Pa.) and 2-dodecylthioxanthone; and certain chromophore-substituted halomethyl-sym-triazines such as 2,4-bis-(trichloromethyl)-6-(3',4'-dimethyoxyphenyl)-sym-triazine (3M, St. Paul, Minn.).

Other preferred independent (monomeric or oligomeric or polymeric) crosslinking agents are polyfunctional benzophenones (that is, compounds having an aliphatic, aromatic or silicic nucleus to which two to four benzoylphenoxy groups are attached) because: (1) they are particularly effective in bringing about rapid gelation of the adhesive composition (2) of their low vapor pressure, and (3) of their thermal stability . Examples of such compounds include:

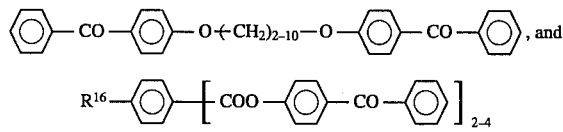

in which $R^{16}$ is hydrogen or an alkyl group having 1 to 18 carbon atoms,

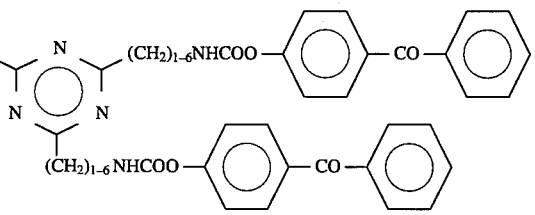

in which $R^{17}$ is alkyl group having 1 to 18 carbon atoms and f is the integer 2, 3, or 4. These compounds can be prepared according to reactions disclosed in *Buehler and Pearson in Survey of Organic Synthesis*, vols. 1 and 2, John Wiley Sons, N.Y. (1977).

When $R^4$ of Formula I is $R^5$, and $R^5$ is an organic vinyl-containing group, a mutually reactive group in the silarylene siloxane copolymer composition is present, e.g., a polyhydrosiloxane crosslinker capable of participating in a hydrosilation reaction with the vinyl group. Suitable polyhydrosiloxane crosslinkers contain at least two hydrosilyl groups such as for example:

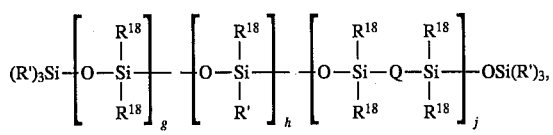

wherein each $R^{18}$ independently can be an alkyl group of 1–6 carbon atoms or phenyl;

each R' independently can be $R^{18}$ or hydrogen, provided that at least two R' groups are hydrogen;

Q can be oxygen, an arylene group having 6 to 16 carbon atoms, an alkylene group having 2 to 16 carbon atoms, or $-(CF_2-)_z$ where z=an integer from 2 to 10;

each g, h, and j is 0 or an integer in the range of to 35 designating the numbers of repeat units.

Specific classes of these crosslinkers are polyhydrosiloxanes containing silicon-hydride groups and having formulae (1) through (5)

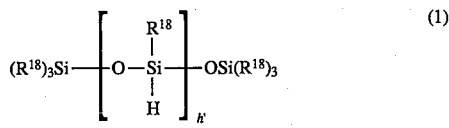

wherein h' can be an integer from 2 to 35 and $R^{18}$ is defined above, and preferably $R^{18}$ is methyl;

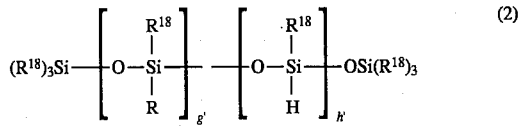

wherein g' can have a value at least one and up to 15 designating the number of repeat units, h' is an integer from 2 to 35, and $R^{18}$ is as defined above, and preferably $R^{18}$ is methyl;

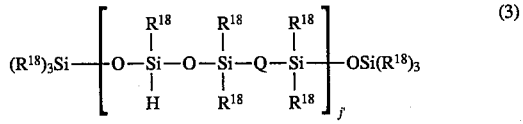

wherein j' can be an integer from 2 to 35, X and $R^{18}$ are defined above, and preferably $R^{18}$ is methyl;

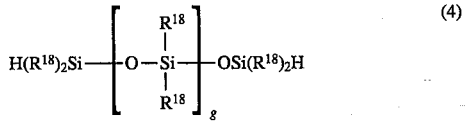

wherein g is 0 or a number up to 35 and $R^{18}$ is defined above, and preferably $R^{18}$ is methyl; and

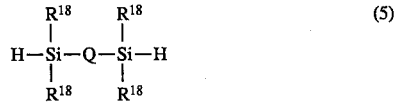

wherein X and $R^{18}$ are as defined above, and preferably $R^{18}$ is methyl. The polyhydrosiloxane crosslinker generally can be present in an amount in the range of 0.1 to 10, preferably 0.5 to 5, and most preferably 0.5 to 2 weight percent based on vinyl containing silarylene siloxane.

Other useful crosslinkers include silica particles having adsorbed onto their surfaces compounds having at least two dimethylhydrosilyl groups; e.g., compound (4) or (5) above can be adsorbed onto silica particles.

The preferred concentration of polyhydrosiloxane crosslinker, having at least 2 hydrosilyl groups, is an amount that provides at least one hydrosilyl group per vinyl group up to about three hydrosilyl groups per vinyl group.

Hydrosilation catalysts useful along with the polyhydrogensiloxane crosslinkers in the composition of the invention where $R^5$ is a vinyl group are well known and include both thermal and photo activated catalysts such as the platinum complexes disclosed in U.S. Pat. Nos. 4,288,345 and 4,510,094. Platinum complexes afford fast reaction and hence are preferred. Useful platinum containing catalysts disclosed in the aforementioned patents include, for example:

chloroplatinic acid, and chloroplatinic acid-olefin complexes, (these two catalysts are available from Petrarch systems Silanes and Silicone)

platinum II-acetylacetonate (available from Aldrich Chemical Co., Milwaukee, Wis.)

($\mu^5$-cyclopentadienyl)trimethylplatinum, ($\mu^5$-cyclopentadienyl)triisopropylplatinum, and (trimethylsilyl-$\mu^5$-cyclopentadienyl) trimethylplatinum (prepared as disclosed in U.S. Pat. No. 4,510,094).

The catalyst can be supported, anchored, or coated on a microparticulate carrier such as alumina, silica or zirconia. The catalyst can be employed in an amount in the range of from 0.1 to 1000 ppm (parts per million) of copolymer composition of the invention, preferably from 1 to 300 ppm. Catalysts not commercially available can be prepared by methods described in U.S. Pat. No. 4,510,094, which is incorporated herein by reference.

When $R^4$ of Formula I is $R^5$ and $R^5$ is an oxirane group containing organic group, there is present in the copolymer composition an epoxy resin curative. Epoxy resin curatives are well known in the art and include both catalysts and curing agents. A summary of useful curatives is given in U.S. Pat. No. 4,707,534, which is incorporated herein by reference for that purpose. Particularly useful epoxy resin curatives include amines such as ethylenediamine, diethylenetriamine, aminoethylenethanolamine, diaminodiphenylsulfone, dicyandiamide, organic acids such as adipic acid, and acid anhydrides such as phthalic anhydride. Generally, a mixture of the epoxy group-containing copolymer and curing agent preferably in stoichiometric amounts (i.e., one active amine hydrogen for each epoxide group) can be cured by heating at 20° to 200° C. for 10 minutes to about 10 hours, preferably 100° to 200° C. for 0.5 to 1.0 hour depending on the particular epoxide compound, curing agent, and the amount of material being cured.

The epoxy group-containing copolymer can also be cured by catalytic agents which can be either thermally-activated or photoactivated.

Examples of the thermally activated catalytic agents include $BF_3$-amine complexes, benzyldimethylamine, and trimethylamine, which are commercially available from Aldrich Chemical Co. Examples of photoactivated catalysts include 4-chlorobenzenediazonium hexafluorophosphate, diphenyliodonium hexafluoroarsenate, and triphenyl hexafluoroarsenate, which are commercially available from G.E. Other photoactivated catalysts are well known and are taught in U.S. Pat. Nos. 4,039,521, 4,069,955, and 4,076,536. When a thermally activated catalyst is employed, from about 0.01 to 20 percent by weight, preferably 0.5 to 5 percent by weight, of catalyst based on the epoxy composition is used. Within these catalyst concentrations, curing can be made to proceed using lower temperatures (e.g., less than 30° to –100° C.) or elevated temperatures (e.g., 30° to 200°, preferably 50° to 100° C.) to either subdue the exotherm of polymerization or to accelerate the polymerization. When a photoactivated catalyst is used, 0.01 to about 10 percent by weight of catalyst, based on epoxy copolymer, is used. Curing is effected by exposing the catalyzed composition to any source of radiation emitting actinic radiation at a wavelength within the visible or ultraviolet spectral regions.

Silane compounds, which can be used to obtain terminated copolymers and chain extended copolymers are $(R^4)_3SiZ$ and $(R^4)_2R^6SiZ$, wherein $R^4$, $R^6$ and $Z$ are as defined above. Examples of suitable terminating $(R^4)_3SiZ$ silanes include: chlorotrimethylsilane, chlorotriphenylsilane, and chlorodimethylvinylsilane, which are commercially available from Petrarch Systems Silanes and Silicones; ureidotrimethylsilane, and reactive-group containing silanes such as (3-acryloyloxy)propyldimethyl-chlorosilane, 3-(2,3-epoxypropoxy)propylchlorodimethyl-silane, and phenyl{4-[3-(bis(dimethylamino) methylsilyl)propoxy]-phenyl}methanone. There is used about two moles of $(R^4)_2R^6SiZ$ or $(R^4)_3SiZ$ silanes per mole of hydroxyl terminated copolymer.

The Formula III silanes such as those described above as suitable for use in the preparation of the copolymer of Formula IV can also be used as chain extending silanes, e.g., those having the formula $(R^4)_2SiZ_2$. There is then used about 0.95 to 1.05 moles of $(R^4)_2SiZ_2$ per mole of hydroxyl terminated copolymer.

Following the chain extending reaction it is often desirable to terminate the polymer by reaction with terminating silanes $(R^4)_2R^6SiZ$.

When the copolymers of the invention are prepared by condensation of silarylene compound of Formula II with silanes of Formula III in which either Y or Z is halogen, the resulting copolymer preferably has 50% of its siloxy groups present in units of one, 40% present in units of two, and 10% present in units of three and the average number of repeat units of siloxy groups (c in Formula IV) is 1.7. The copolymer preferably has 50% of its silarylene groups present in monads and the remaining 50% in diads or triads with the average number of repeat units of the silarylene groups is 1.55.

When the copolymers of the invention are prepared by condensation of bishydroxysilarylenes of Formula II with silanes of Formula III in which Z is an amino group

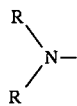

wherein each R is a linear or branched alkyl group having 1 to 4 carbon atoms or both Rs together can form an alkylene group having 4 to 8 carbon atoms, then the resulting copolymer preferably has 90% of its siloxy groups and 95% of its silarylene groups present in monads and the remaining 10% of siloxy groups present in diads and the remaining 5% of silarylene groups in diads or triads.

When the copolymers of the invention are prepared by condensation of a bishydroxysilarylene of Formula II with silanes of Formula III in which Z is a substituted ureido group such as the N-phenylureido group, then the resulting copolymer has alternating silarylene and siloxy groups, i.e., c in Formula IV is 1.0.

The cured silarylene-siloxane copolymers of the invention when provided as a coating on a flexible backing are particularly useful as elevated temperature resistant pressure sensitive adhesive tapes. The cured PSA of the invention is useful as a layer bonding two substrates together to provide a laminated structure.

TEST METHODS

The test procedures used in the examples to evaluate and compare the properties of the PSA compositions and tapes made from them are industry standard tests. These tests are described in detail in various publications of the American Society for Testing Materials (ASTM), Philadelphia, Pa. and the Pressure Sensitive Tape Council (PSTC), Glenview, Ill. References to these standards are also given.

Shear Strength (ASTM D-2654-78; PSTC - 7)

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in units of time (minutes) required to pull a standard area of PSA coated sheet material from a stainless steel test panel under stress of a constant, standard load.

The tests were conducted on adhesive coated strips applied to a stainless steel panel such that a 12.7 mm by 12.7 mm portion of each strip was in firm contact with the panel with one end portion of the tape being free. The panel with adhesive coated strip attached was held in a rack such that the coated surface of the panel forms an angle of 182° with the vertical tape free end which was then tensioned by application of a force of one kilogram applied as a hanging weight from the free end of the coated strip. The 2° greater than 180° was used to negate peel forces, thus ensuring that only the shear forces were measured in order to more accurately determine the holding power of the tape being tested. Time elapsed for each test specimen to separate from the steel panel was recorded as the shear strength.

PP=Pop-off, i.e., 75–100% adhesive failure from steel plate. Pressure-sensitive adhesive compositions derived from the inventive copolymers have shear strengths exceeding 500 minutes at 22° C. and 50% R.H.

Peel Adhesion (ASTM D 3330-78; PSTC - 1 (11/75))

The peel adhesion is the force required to remove a PSA coated test specimen from a test panel measured at a specific angle and rate of removal. In the examples, this force is expressed in Newtons per decimeter (N/dm) width of coated sheet. The procedure followed was:

1) A test specimen 25.4 mm wide was applied to a horizontally positioned clean glass test plate. A 2.2 kg rubber roller was used to press a 12.7 cm length of specimen into firm contact with the glass surface.
2) The free end of the specimen was doubled back nearly touching itself so the angle of removal was 180°. The free end was attached to the adhesion tester scale.
3) The glass test plate was clamped in the jaws of tensile testing machine which was capable of moving the plate away from the scale at a constant rate of 2.3 meters per minute.
4) The scale reading in Newtons was recorded as the tape was peeled from the glass surface.

Objects and advantages of this invention are further illustrated by the following examples, but the particular materials and amounts thereof recited in these examples, as well as other conditions and details, should not be construed to unduly limit this invention. Temperatures are expressed in degrees centigrade and parts are parts by weight.

SYNTHESIS OF SILANE COMPOUNDS

Bis(dimethylhydroxysilyl)benzene (Compound 1), bis-(dimethylamino)diphenylsilane (Compound 2 ), bis(dimethylamino)dimethylsilane (Compound 3 ), bis(dimethylamino)methylvinylsilane (Compound 4). methacryloxypropylmethyldichlorosilane (Compound 5), were obtained from Petrach Systems, Bristol, Pa., and were purified and dried before use.

Preparations of bis(uriedo)methylvinylsilane (Compound 6), phenyl{4-[3-(bis(dimethylamino)methylsilyl)propoxyphenyl}methanone (Compound 7), and phenyl{4-[(3-methyldichlorosilyl)propoxy]phenyl}methanone (Compound 8) were prepared according to the procedures described in Macromolecules, Vol. 12, 373, 1979.

Hydrosiloxane (DC-1107™, Compound 9) containing 35 repeat units were obtained from Dow Chemicals, Mich.

Polymer molecular weights were determined by gel permeation chromatographic analysis using polystyrene as an internal standard.

Preparation of
1,3-bis(p-dimethylhydroxysilylphenyl)-2-vinyl-
1,1,2,3,3-pentamethyltrisiloxane (Compound 10)

1,4-Bis(dimethylhydroxysilyl)benzene (Compound 1) (19.6 g, 0.0867 mole) was placed in a weighed three-necked, 500 mL round-bottom flask and dried overnight in a vacuum oven at 50° C. The flask was reweighed, fitted with a thermometer, a mechanical stirrer, and a septum sealed opening. After the system was purged with nitrogen, dry 200 mL tetrahydrofuran (THF) and 8.8 g (0.0867 mole) of pyridine was charged to the reaction flask. A solution of 6.069 g (0.0434 mole) dry vinylmethyldicholosilane in toluene was added drop-wise over a period of three hours at 0°–5° C. The solution was slowly allowed to warm to room temperature over a 12-hour period. The reaction mixture was filtered under reduced pressure to remove pyridine hydrochloride. The product was freed from solvent and silane and the product was dried under vacuum to constant weight. The product was obtained in 85% yield and confirmed by spectral analysis to be 1,3-bis(p-dimethylhydroxysilylphenyl)-2-vinyl-1,1,2,3,3-pentamethyltrisiloxane having the structural formula

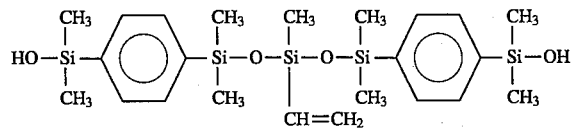

SYNTHESIS OF SILANOL TERMINATED SILARYLENE-SILOXANE PREPOLYMERS

Prepolymer A 1,4-Bis(dimethylhydroxysilyl)benzene (Compound 1) (196 g, 0.867 mole) was placed in a weighed three-necked, 5000 mL round-bottom flask and dried overnight in a vacuum oven at 50° C. The flask was reweighed, fitted with a thermometer, a mechanical stirrer, and a two-outlet adapter supporting a reflux condenser and a septum sealed opening. After the system had been purged with nitrogen, dry toluene (1000 ml) was added, a positive nitrogen pressure as established and the reaction was slowly heated to a gentle reflux (95° to 105° C.). Under nitrogen atmosphere, about 69.6 g of bis(dimethylamino)diphenylsilane (Compound 2) and 26.7 g of bis(dimethylamino)dimethylsilane (Compound 3) were charged to the reaction flask. Then, at 6 hour intervals there was added 12.96 g (0,048 moles) of Compound 2 and 4.67 g (0,032 moles) of Compound 3 until 121.4 g (0.45 moles) total of Compound 2 and 45.4 g (0.31 moles) total of Compound 3 had been added providing 0.88 moles of aminosilanes per mole of arene. The reaction mixture was refluxed for an additional 10 hours. The resulting polymer was slowly added to a large excess methanol. After decanting the methanol, the product, a low viscosity tacky gum, was dried to a constant weight under vacuum at 80° C. The copolymer was obtained in 80% yield (based on silanes used). The number average molecular weight of the polymer was 52,000 as determined from gel permeation chromatographic analysis. Analysis of the copolymer by nuclear magnetic resonance, NMR, revealed that 90% of its siloxy groups and 95% of its silarylene groups were present as single units and the remaining 10% siloxy groups were present in units of 2 and the remaining 5% of silarylene groups were present in units of 2 or 3, and in some instances may be up to 6. The copolymer had the approximate formula:

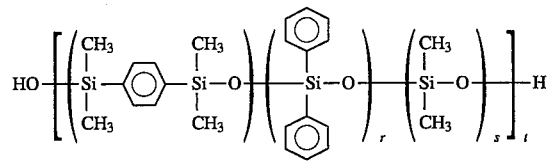

in which r is 0.5, s is 0.4, and t is 135.

Prepolymer B

The procedure for the synthesis of the copolymer was the same as in prepolymer A except that the ratio between Compound 2 and Compound 3 was 0.75 to 0.25 and the ratio between diol to silanes was 1.0 to 0.91. The resulting polymer was slowly added to a large excess of methanol. After decanting the methanol, the product, a low viscosity tacky gum, was dried to a constant weight under vacuum at 80° C. The copolymer was obtained in 75% yield (based on silanes used). The number average molecular weight of the polymer was 55,000 and its approximate formula was the same as that of Prepolymer A in which r is 0.7, s is 0.23, and t is 150.

Prepolymer C

The procedure for the synthesis of the copolymer was the same as in prepolymer A except that the ratio between Compound 2 to Compound 3 was 90:10 and the ratio between diol to silanes was 1.0 to 0.95. The resulting polymer was slowly added to a large excess of methanol. After decanting the methanol, the product which was a low viscosity gum was dried to a constant weight under vacuum at 80° C. The copolymer was obtained in 82% yield (based on silanes used). The number average molecular weight of the polymer was 64,000 and its approximate formula was the same as that of Prepolymer A in which r is 0.85, s is 0.1, and t is 165.

Prepolymer D (comparative)

The procedure for the synthesis of the copolymer was the same as in prepolymer A except that the ratio between Compound 2 to Compound 3 was 50:50 and the ratio between diol to silanes was 1.0 to 0.93. The resulting polymer was slowly added to a large excess of methanol. After decanting the methanol, the product, a low viscosity non-tacky polymer, was dried to a constant weight under vacuum at 80° C. The copolymer was obtained in 80% yield (based on silanes used). The number average molecular weight of the polymer was 42,000 and its approximate formula is the same as that of Prepolymer A in which r is 0.5, s is 0.5, and t is 120.

HIGH MOLECULAR WEIGHT SILARYLENE-SILOXANE FUNCTIONAL POLYMERS

Example 1 a) Preparation of higher molecular silarylene-siloxane polymer from hydroxy terminated silarylene-siloxane prepolymers with different dichlorosilanes Prepolymer A (20 g, $2.9 \times 10^{-4}$ mole) was weighed into a 500 ml one-neck flask containing a magnetic stirrer. The flask was vacuum pumped at 100° C. overnight to dry the sample. The flask was septum sealed under nitrogen and cooled to 0°–5° C.; 150 ml of dry tetrahydrofuran was added. The contents were allowed to dissolve. The polymer solution was slowly stirred under a nitrogen blanket. Methacryloxypropylmethyldichlorosilane (Compound 5) (0.08 g, $3.3 \times 10^{-4}$ mol) in 10 mL of dry tetrahydrofuran was slowly titrated into polymer solution until the polymer solution became very viscous. The polymer mass was back titrated with bis(dimethylhydroxysilyl)benzene (0.04 g, $1.7 \times 10^{-4}$ mol) in 10 ml of tetrahydrofuran over 6.0 hours to ensure that the polymer was terminated by silarylene units. The polymer was precipitated in excess of methanol; the methanol was decanted and the product, a tacky gum, was dried in a vacuum oven at 80° C. The weight average molecular weight of the copolymer was 550,000 with a dispersity of 1.8 and it had the approximate formula:

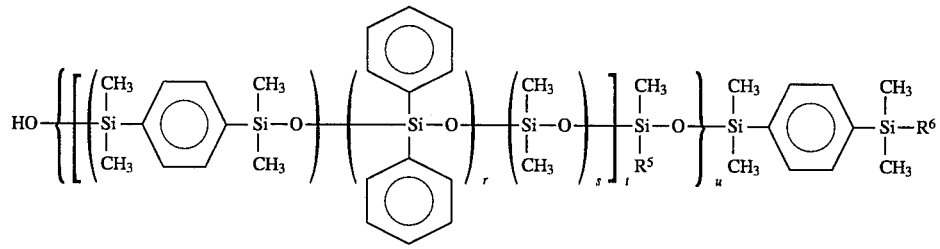

in which r=0.5, s=0.4, t=135, u=10.5, $R^6$=OH, and

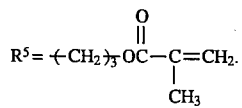

b) The above procedure was repeated with prepolymer B to obtain tacky silarylene-siloxane copolymer containing methacrylate pendants having a weight average molecular weight of 520,000 with a dispersity of 1.9 and an approximate formula the same as copolymer 1A in which r=0.7, s=0.23 and t is 150, $R^5$ is

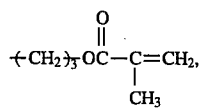

$R^6$ is OH, and u was 9.

c) The procedure (a) was repeated with prepolymer C to obtain tacky silarylene-siloxane copolymer containing methacrylate pendants having a weight average molecular weight of 440,000 with a dispersity of 2.1 and an approximate formula the same as that of copolymer 1a in which r=0 85, s is 0 1, t is 165, $R^5$ and $R^6$ were the same as for copolymer 1a and u is 6.8.

d) The procedure (a) was repeated with prepolymer D to obtain non-tacky silarylene-siloxane copolymer containing methacrylate pendants having a weight average of 590,000 with a dispersity of 2.5. This was a comparative polymer having less than 55 mole % of aryl groups in $R^4$. It had an approximate formula the same as that of copolymer 1a but in which r=0.5, s=0.5, t=120, and u=14.

e) The procedure (a) was repeated by substituting phenyl{4-[3-methyldichlorosilyl)propoxy]phenyl}methanone (Compound 8) for methacryloxypropylmethyldichlorosilane to obtain tacky high molecular weight silarylene-siloxane copolymers containing benzophenone pendant units. The weight average molecular weight of the copolymer was 650,000 with a dispersity of 1.8. The polymer obtained had an approximate formula that was the same as that of copolymer 1a except that r=0.5 to 0.6, s=0.4, t=135, and $R^5$ is

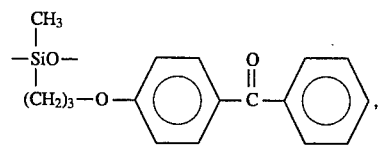

$R^6$ was OH, and u was 12.

f) Methylvinyldichlorosilane was used for methacryloxypropylmethyldichlorosilane in procedure (a) to obtain a tacky high molecular weight copolymer containing vinyl pendant units.

Example 2 a) Preparation of higher molecular silarylene-siloxane polymer from hydroxy terminated silarylene-siloxane prepolymers with different bis(ureido)silanes Prepolymer A (20 g, $3.9 \times 10^{-4}$ mole) was weighed into 500 mL one-neck flask containing magnetic stirrer. The flask was vacuum pumped at 100° C. overnight to dry the sample. The flask was septum sealed under nitrogen and cooled to −10° to 0° C.; 150 mL of dry chlorobenzene was added. The polymer dispersion was slowly stirred under nitrogen blanket. Bis(ureido)methacryloxypropylmethylsilane (0.08 g, $1.45 \times 10^{-4}$ mol) in 10 mL of dry chlorobenzene was slowly titrated into polymer solution until the polymer solution became very viscous. The polymer mass was back titrated with bis(dimethylhydroxysilyl)benzene (0.04 g, $1.7 \times 10^{-4}$ mol) in 10 mL of tetrahydrofuran over a period of 6.0 hours.

The polymer was precipitated in an excess of methanol; the methanol was decanted and the product, a tacky gum, was dried in a vacuum oven at 80° C. The weight average molecular weight of the copolymer was 840,000 with a dispersity of 2.6. It had an approximate copolymer the same as that of copolymer 1a except that u was 16.

b) The procedure in Example 2a was repeated with prepolymer D to obtain a non-tacky silarylene-siloxane copolymer containing methacrylate pendants having a weight average molecular weight of 590,000 with a dispersity of 2.5. This polymer was a comparative example.

c) Bis(ueido)methylvinylsilane was used for bis(ueido)methacryloxypropylmethylsilane in procedure (a) to obtain a tacky high molecular weight copolymer containing vinyl pendant units.

Example 3 a) Preparation of higher molecular silarylene-siloxane polymer from hydroxy terminated silarylene-siloxane prepolymers with different bis(dimethylamino)silanes Prepolymer A (20 g, $3.9 \times 10^{-4}$ mol) was weighed into 500 mL two-necked flask containing a magnetic stirrer. The flask was vacuum pumped at 100° C. overnight to dry the sample. The flask was septum sealed to one neck and the other was fitted with a reflux condenser. Positive nitrogen pressure was maintained throughout the course of the reaction. About 150 mL of dry toluene was added. The contents were allowed to dissolve.

Bis(dimethylamino)methylvinylsilane (0.08 g, $5.06 \times 10^{-4}$ mol) in 10 mL of dry toluene was slowly added into polymer while refluxing the mixture at 95°–105° C. until the polymer solution became very viscous. The polymer mass was back titrated with bis(dimethylhydroxysilyl)benzene (0.04 g, $1.7 \times 10^{-4}$ mol) in 10 mL of tetrahydrofuran over 6.0 hours. The polymer was precipitated in an excess of methanol; the methanol was decanted and the product, a tacky gum, was dried in a vacuum oven at 80° C. The weight average molecular weight of the copolymer was 580,000 with a dispersity of 2.2. The copolymer had an approximate formula the same as that of copolymer 1a except that $R^5$ was —CH=CH$_2$, and u was 11.5.

b) The above procedure was repeated with prepolymer B to obtain a tacky silarylene-siloxane copolymer containing vinyl pendant units having a weight average molecular weight of 750,000 with a dispersity of 2.4. The copolymer had an approximate formula the same as that of copolymer 1b except that $R^5$ was —CH=CH$_2$, and u was 11.

c) The procedure (a) was repeated with prepolymer C to obtain a tacky silarylene-siloxane copolymer containing vinyl pendant units having a weight average molecular weight of 650,000 with a dispersity of 2.4. The copolymer had an approximate formula the same as that of copolymer 1c except that $R^5$ was —CH=CH$_2$, and u was 10.

d) The procedure (a) was repeated with prepolymer D to obtain a non-tacky silarylene-siloxane copolymer containing vinyl pendant units having a weight average molecular weight of 510,000 with a dispersity of 2.3, which was a comparative polymer. The copolymer had an approximate formula the same as that of copolymer 1d except that $R^5$ was —CH=CH$_2$ and u was 11.

e) The procedure (a) was repeated by substituting phenyl{4-[3-((bisdimethylamino)methylsilyl)propoxy]phenyl}-methanone for bis(dimethylamino)methylvinylsilane to obtain tacky high molecular weight silarylene-siloxane copolymers containing benzophenone pendant units. The weight average molecular weight of the copolymer was 490,000 with a dispersity of 2.6. The copolymer had an approximate formula the same as that of copolymer 1e except that $R^5$ was

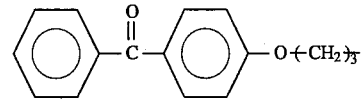

and u was 9.

Example 4

SYNTHESIS OF SILARYLENE-SILOXANE RANDOM COPOLYMER CONTAINING PENDANT VINYL UNITS 1,4-bis(dimethylhydroxysilyl)benzene (Compound 1) (19.6 g, 0.0867 mole) and silarylene condensate (Compound 10) (0.4 g, 0.0008 mole) were placed in a weighed three-necked, 500 mL round-bottom flask and dried overnight in a vacuum oven at 50° C. The flask was reweighed, fitted with a thermometer, a mechanical stirrer, and a two-outlet adapter supporting a reflux condenser and a septum sealed opening. After the system had been purged with nitrogen, dry toluene (200 mL) was added, a positive nitrogen pressure was established and the reaction was slowly heated to a gentle reflux (95° to 105° C.). Under nitrogen atmosphere, about 14.18 g of Compound 2 (0.062 mole) and 7.07 g of Compound 3 (0.040 mole) were charged to the reaction flask. The reaction mixture was refluxed for 10 hours, and then slowly poured into a large excess of methanol. After decanting the methanol, the product, a tacky gum, was dried to a constant weight under vacuum at 80° C. The copolymer was obtained in 80% yield (based on silanes used). The weight average molecular weight of the polymer was 250,000 with a dispersity of 1.5.

PREPARATION OF PRESSURE-SENSITIVE ADHESIVES

Example 5

Into a solution of 5 g of the copolymer prepared in Example 1a, above, in 10 mL of toluene was added 0.1 g of 2,2-dimethoxy-2-phenyl acetophenone (Irgacure™ 651, Ciba-Geigy, Hawthorne, N.Y.) and the solution was knife-coated onto biaxially oriented poly(ethyleneterephthalate) backing; dry coating weight was 3.8 mg/cm$^2$. The solvent was evaporated at room temperature and the hand spread was heated at 150° C. for 5 minutes. The layer of copolymer was cured under low intensity UV lights for five minutes. After conditioning overnight at constant temperature (22° C.) and humidity (50% RH); the peel adhesion of the pressure-sensitive adhesive tape obtained was determined according to the procedure described above. The tape had a peel adhesion from glass of 35 N/dm with a shear of 1000+minutes.

Example 6

A solution of 5 g of the copolymer prepared in Example 1f) in 10 mL of toluene was knife-coated onto polyester film. The layer of copolymer obtained was cured in an RPC processor model #QC1202 ANIR (available from PPG Industries, Chicago, Ill.) at 30 cm/sec with two standard medium pressure mercury vapor lamps operating at 80 watts per centimeter. The lamps were located approximately 9.5 cm from the adhesive surface. Multiple passes through the processor were used to increase the degree of cure with no delay between subsequent passes. The total dose was 600 mJ/cm². After conditioning overnight at constant temperature (22° C.) and humidity (50% RH), the peel adhesion of the tapes obtained was measured. The tape had a peel adhesion from glass of 30 N/dm with a shear of 550 minutes with pop-off failure.

Example 7

A solution of 5 g of the copolymer of Example 3e) in 10 mL of toluene was knife-coated onto polyester film. The layer of copolymer obtained was cured in an RPC processor under high intensity UV with a dose of 600 mJ/cm². After conditioning overnight at constant temperature (22° C.) and humidity (50% RH), peel adhesion from glass of the tape obtained was measured. The tape had a peel adhesion from glass of 30 N/dm with a shear of 550 minutes with pop-off failure.

Example 8

A solution of 9.95 parts of copolymer prepared in Example 2C) and 0.05 parts of hydrosiloxane Compound 9 and 250 ppm of cyclopentadienyltrimethyl platinum were dissolved in 30 parts of toluene. The polymer solution obtained was then coated using a hand spread coater. The copolymer coating was cured in RPC processor under high intensity UV with a dose of 600 mJ/cm². After conditioning overnight at constant temperature (22° C.) and humidity (50% RH), the peel adhesion of the pressure-sensitive tape obtained was measured. The tape had a peel adhesion from glass of 28 N/dm with a shear of 1550 minutes with pop-off failure.

Examples 9–12

The curable PSA compositions from Examples 5, 6, 7, and 8 and using the procedures disclosed therein were coated onto Kapton™-H polyimide backing (Dupont), and were aged at 300° C. for 24 hours in air. The cured PSAs showed no change in peel adhesion as compared to unaged cured PSA samples of Examples 5, 6, 7, and 8, indicating their utility for high temperature application.

Various modifications and alterations of this invention will become apparent to those skilled in the art without departing from the scope and spirit of this invention, and it should be understood that this invention is not to be unduly limited to the illustrative embodiments set forth herein.

I claim:

1. A crosslinkable silarylene-siloxane pressure sensitive adhesive copolymer composition comprises a copolymer comprising a backbone having a randomly arranged silarylene units and siloxane units, of which siloxane units at least 55 mol percent are arylsiloxane units, there being an average of no more than two consecutive units of either siloxane or silarylene in the backbone of the copolymer, said copolymer comprising at least 0.05 mol percent crosslinking functionality wherein said silarylene group of said copolymer in said composition has the formula

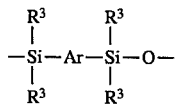

wherein
R³ is independently a lower alkyl group having 1 to 4 carbon atoms;
Ar is an arylene or alkylenearylene group having 6 to 20 carbon atoms, and said siloxane group has the formula

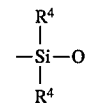

wherein
each R⁴ is an organic group independently selected from the group consisting of aryl groups having 6 to 12 carbon atoms, linear and branched alkyl groups having 1 to 6 carbon atoms and R⁵ groups, of which R⁴ groups 55 to 95 mol % are aryl groups, 5 to 45 mol % are alkyl groups, and 0.05 to 5 mol % are R⁵ groups; and
R⁵ is a functional crosslinking group selected from the organic group consisting of
a) an ethylenically-unsaturated group selected from the group consisting of 1) groups crosslinkable under the influence of free radicals, and 2) groups crosslinkable in a hydrosilation reaction with polyhydrosiloxane
b) an oxirane group, and
c) a group that is a photoinitiator of crosslinking with the proviso:
(1) that when R⁵ is an acrylic group there is present in the composition a sufficient amount of an initiator of free radicals to effect crosslinking,
(2) that when R⁵ is a vinyl group attached directly to a Si atom there is present in the composition a sufficient amount of polyhydrosiloxane and a sufficient amount of catalyst for a hydrosilation reaction, and
(3) that when R⁵ is an oxirane-containing group there is present in the composition a sufficient amount of epoxy resin curative to effect crosslinking and
(4) that when R⁵ is a photocrosslinker there is sufficient amount of photocrosslinking group present in the composition to crosslink the copolymer.

2. The silarylene-siloxane copolymer composition of claim 1 curable to a pressure-sensitive adhesive comprising a copolymer having a general formula

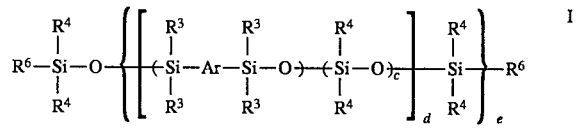

wherein
R³, Ar, and R⁴ are as previously defined, and
c is a number having a value of 0.8 to 1.2 expressing the number of siloxane groups per arylene or alkarylene groups;
d is a number having an average value of 50 to 500;
e is a number having a value from 1 to about 200; and
each R⁶ is a terminal group.

3. The composition according to claim 2 wherein R⁶ of said copolymer is independently hydroxyl, lower alkyl, phenyl, or R⁵, wherein R⁵ is as previously defined.

4. The silarylene-siloxane copolymer composition according to claim 2 wherein the copolymer is prepared by a process comprising the steps of
   a) condensing one or more of a silarylene compound having the structural formula $$Y-\underset{\underset{R^3}{|}}{\overset{\overset{R^3}{|}}{Si}}-Ar-\underset{\underset{R^3}{|}}{\overset{\overset{R^3}{|}}{Si}}-Y$$

with a diorganic group substituted silane having the structural formula $$Z-\underset{\underset{R^4}{|}}{\overset{\overset{R^4}{|}}{Si}}-Z$$

in which $R^3$, $R^4$, and Ar are as previously defined and Y and Z are mutually reactive groups which independently are hydroxyl or a hydrolyzable group, to produce a copolymer having the formula $$HO-\left(\left(\underset{\underset{R^3}{|}}{\overset{\overset{R^3}{|}}{Si}}-Ar-\underset{\underset{R^3}{|}}{\overset{\overset{R^3}{|}}{Si}}-O\right)-\left(\underset{\underset{R^4}{|}}{\overset{\overset{R^4}{|}}{Si}}-O\right)_c\right)_d-H, \quad \text{IV}$$

wherein
$R^3$, $R^4$, and Ar are as previously defined, and
d is a number having an average value of 50 to 500;
   b) reacting said copolymer IV with a chain extender of formula $(R^4)_2SiZ_2$, wherein $R^4$ and Z are as previously defined, and with a silyl compound of formula $(R^4)_2R^6SiZ$, wherein $R^6$, $R^4$, and Z are as previously defined, to produce a copolymer having the formula $$R^6-\underset{\underset{R^4}{|}}{\overset{\overset{R^4}{|}}{Si}}-O-\left(\left(\underset{\underset{R^3}{|}}{\overset{\overset{R^3}{|}}{Si}}-Ar-\underset{\underset{R^3}{|}}{\overset{\overset{R^3}{|}}{Si}}-O\right)-\left(\underset{\underset{R^4}{|}}{\overset{\overset{R^4}{|}}{Si}}-O\right)_c\right)_d-\underset{\underset{R^4}{|}}{\overset{\overset{R^4}{|}}{Si}}-R^6, \quad \text{I}$$

wherein Ar, $R^3$, $R^4$, $R^6$, c, d, and e are as previously defined.

5. The copolymer composition according to claim 4 wherein in said process Y or Z is a halogen.

6. The copolymer composition of claim 4 in which in said process, Y and Z is a hydrolyzable group.

7. The copolymer composition according to claim 2 wherein said copolymer has a weight average molecular weight in the range of 440,000 to 5,000,000.

8. The composition according to claim 1 wherein Ar of said copolymer is a phenylene or biphenylene group.

9. The composition according to claim 8 wherein said phenylene or biphenylene group is substituted by at least one $C_1$ to $C_4$ alkyl group.

10. The composition according to claim 1 further comprising an effective amount of a catalyst to effect crosslinking of said copolymer when $R^5$ is an ethylenically unsaturated group.

11. The composition according to claim 1 wherein the crosslinking functionality $R^5$ is an acrylic or methacrylic group and said composition further comprising an initiator of free radicals.

12. The composition according to claim 1 wherein the crosslinking functionality $R^5$ is a vinyl group and said composition further comprises a polyhydrosiloxane crosslinker and an effective amount of a hydrosilation catalyst therefor.

13. The composition according to claim 1 wherein the crosslinking functionality $R^5$ is an oxirane-containing group and said composition further comprising an effective amount of an epoxy resin curative to effect crosslinking.

14. The composition according to claim 13 wherein said epoxy resin curative is thermally- or photo-activatable.

15. The composition according to claim 1 wherein the crosslinking functionality is a photocrosslinking group selected from the group consisting of $-CH_2CH_2CH_2-O-\phenyl-CO-\phenyl$ $-CH_2CH_2CH_2-N\begin{array}{c}CO-CCH_3\\ \diagdown\\ CO-CCH_3,\end{array}$ $-CH_2CH_2-O\overset{O}{\overset{\|}{C}}-CH=CH-\phenyl$ $-CH_2CH_2-O\overset{O}{\overset{\|}{C}}-CH=CH-CH=CH-\phenyl$ and $-CH_2CH_2CH_2-O-CH_2-\underset{\underset{H_2C}{|}\diagdown_O\diagup^{CH_2}}{\overset{H_2C\diagup^O\diagdown CH_2}{C}}-N\underset{CH_2.}{\diagup^{CH_2}}$ 16. The composition according to claim 1 wherein said backbone comprises no more than six consecutive units of either siloxane or silarylene units.

17. The composition according to claim 1 wherein said backbone comprises no more than two consecutive units of either siloxane or silarylene units.

18. The composition according to claim 1 wherein the ratio of siloxane to silarylene units is in the range of 0.8 to 1.2.

19. The composition according to claim 1 wherein said composition comprises in the range of 0.05 to 3 mol percent of a crosslinking functionality.

20. The crosslinked composition of claim 1.

21. A substrate bearing a layer of the crosslinked composition of claim 20.

22. The composition according to claim 20 which is a coating on a flexible backing to provide a pressure-sensitive adhesive tape.

23. A laminate comprising two or more substrates, there being between each of the substrates a layer of the cured composition of claim 1.

24. The copolymer composition according to claim 1 wherein the copolymer is prepared by a method comprising the steps:

a) reacting a mixture comprising a silarylene compound with a diorganic group substituted silane, said silarylene compound and said silane comprising mutually reactive groups to provide a reactive precopolymer, and
b) reacting said reactive precopolymer with a chain extending silyl compound to provide a copolymer having a weight average molecular weight of at least 500,000.

25. The copolymer composition according to claim 24 wherein said method further comprises the step of curing said copolymer to provide a crosslinked copolymer.

* * * * *

UNITED STATES PATENT AND TRADEMARK OFFICE
CERTIFICATE OF CORRECTION

PATENT NO.: 5,578,380

DATED: Nov. 26, 1996

INVENTOR(S): Gaddam N. Babu.

It is certified that the following errors appear in the above-identified patent and that said Letters Patent is hereby corrected as shown below:

On the cover page, please insert
--[73] Assignee: Minnesota Mining and Manufacturing Company, St. Paul, Minn.--
after the inventor's name and address.

Signed and Sealed this

Twenty-first Day of April, 1998

Attest:

BRUCE LEHMAN

*Attesting Officer*      *Commissioner of Patents and Trademarks*